United States Patent
Kobayashi (10) Patent No.: US 11,838,631 B2
(45) Date of Patent: Dec. 5, 2023

(54) IMAGE PROCESSING DEVICE, IMAGE PROCESSING METHOD, NON-TRANSITORY COMPUTER-READABLE STORAGE MEDIUM

(71) Applicant: CANON KABUSHIKI KAISHA, Tokyo (JP)

(72) Inventor: Masaaki Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/719,706

(22) Filed: Apr. 13, 2022

(65) Prior Publication Data

US 2022/0337752 A1    Oct. 20, 2022

(30) Foreign Application Priority Data

Apr. 20, 2021 (JP) ................................. 2021-071332

(51) Int. Cl.
*H04N 23/68* (2023.01)
*G06T 5/00* (2006.01)

(52) U.S. Cl.
CPC ........... *H04N 23/683* (2023.01); *G06T 5/003* (2013.01); *G06T 2207/20201* (2013.01)

(58) Field of Classification Search
CPC .............. H04N 23/683; H04N 23/631; H04N 23/6811; H04N 23/62; H04N 5/144; G06T 5/003; G06T 7/215

See application file for complete search history.

(56) References Cited

U.S. PATENT DOCUMENTS

| | | | |
|---|---|---|---|
| 9,402,025 B2 | 7/2016 | Kobayashi | |
| 9,536,169 B2 | 1/2017 | Kobayashi | |
| 10,818,018 B2 | 10/2020 | Kobayashi et al. | |
| 2005/0219374 A1* | 10/2005 | Uenaka | H04N 23/68 |
| | | | 348/E5.046 |
| 2018/0213155 A1* | 7/2018 | Takayanagi | H04N 23/6811 |
| 2020/0195843 A1* | 6/2020 | Kawawa | H04N 5/232 |
| 2021/0385383 A1* | 12/2021 | Kim | G01P 15/18 |

FOREIGN PATENT DOCUMENTS

JP    H03-277078 A    12/1991

* cited by examiner

*Primary Examiner* — Christopher K Peterson
(74) *Attorney, Agent, or Firm* — Carter, DeLuca & Farrell LLP

(57) ABSTRACT

An image processing device comprises a specification unit configured to specify, among a plurality of frames constituting a moving image, a section in the moving image of frames corresponding to a scene whose shake amount is larger, based on the plurality of frames, and an output unit configured to output information representing the section.

9 Claims, 6 Drawing Sheets

IMAGE PROCESSING DEVICE, IMAGE PROCESSING METHOD, NON-TRANSITORY COMPUTER-READABLE STORAGE MEDIUM

BACKGROUND OF THE INVENTION

Field of the Invention

The present invention relates to a technique for presenting information on a shake amount in a moving image.

Description of the Related Art

In image processing of moving images, anti-shake (camera shake correction) is an important element of image quality enhancement. Anti-shake processing consists of shake detection and image correction processing. The former estimates shake information from gyro sensors and the like or estimates shake information from movements between frames. The latter suppresses the shake by physically operating a lens or a sensor based on the shake information so as to cancel the shake in the image to be captured or obtains a corrected image by digitally performing a geometrical correction so as to cancel the shake in the image once captured. Anti-shake is often performed at the time of image capturing in the camera; however, there are cases where digitally performed geometric correction is performed as a process in the process of editing and modifying the recorded content by a PC (personal computer) or the like.

Recently, it has become possible to capture high-resolution moving images such as 8K and 4K moving images. However, editing (including effect modification) and playback processing are extremely burdening; therefore, it is difficult to edit and play back in real time. Largely, two methods are conceivable for playing back high-resolution moving images in real time with the current technology.

The first method is to store the moving image in RAM and read it from RAM for display. However, this requires a large amount of memory, and PCs used by typical users have a small memory and can store only about a few seconds of moving images.

Another method is to encode the content and, during playback, decode and display it in dedicated hardware while reading the encoded stream. Since the amount of data is reduced by encoding the moving image, it is possible to read the encoded data at a speed that can be played back in real time even if it is stored on a low-speed HDD (hard disk) and read again. This method enables playback of content for a relatively long time; however, when it is desired to adjust the parameters at the time of modification, it is necessary to repeat the process encoding and decoding over time.

A method of presenting a shake state to a user is disclosed in Japanese Patent Laid-Open No. H 3-277078. The invention disclosed in Japanese Patent Laid-Open No. H3-277078 presents to a user that a shake has occurred at the moment of capturing when capturing with a camera.

In the case of editing a captured moving image, in order to confirm the degree of shake of the moving image and the result of the shake correction, it is necessary for the user to play back the moving image in real time and view the portions where the shake amount is large.

SUMMARY OF THE INVENTION

The present invention provides a technique for notifying a user of a frame section of a scene with a large amount of shake in a moving image.

According to the first aspect of the present invention, there is provided an image processing device comprising: a specification unit configured to specify, among a plurality of frames constituting a moving image, a section in the moving image of frames corresponding to a scene whose shake amount is larger, based on the plurality of frames; and an output unit configured to output information representing the section.

According to the second aspect of the present invention, there is provided an image processing method comprising: specifying, among a plurality of frames constituting a moving image, a section in the moving image of frames corresponding to a scene whose shake amount is larger, based on the plurality of frames; and outputting information representing the section.

According to the third aspect of the present invention, there is provided a non-transitory computer-readable storage medium that stores a computer program for causing a computer to function as: a specification unit configured to specify, among a plurality of frames constituting a moving image, a section in the moving image of frames corresponding to a scene whose shake amount is larger, based on the plurality of frames; and an output unit configured to output information representing the section.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, an image processing device for presenting, to a user, a graph image by generating and displaying the graph image, which is a graph representing the amount of shake for each frame in a moving image and superimposed with information representing a frame section of a scene whose shake amount is larger will be described.

Figure 1:
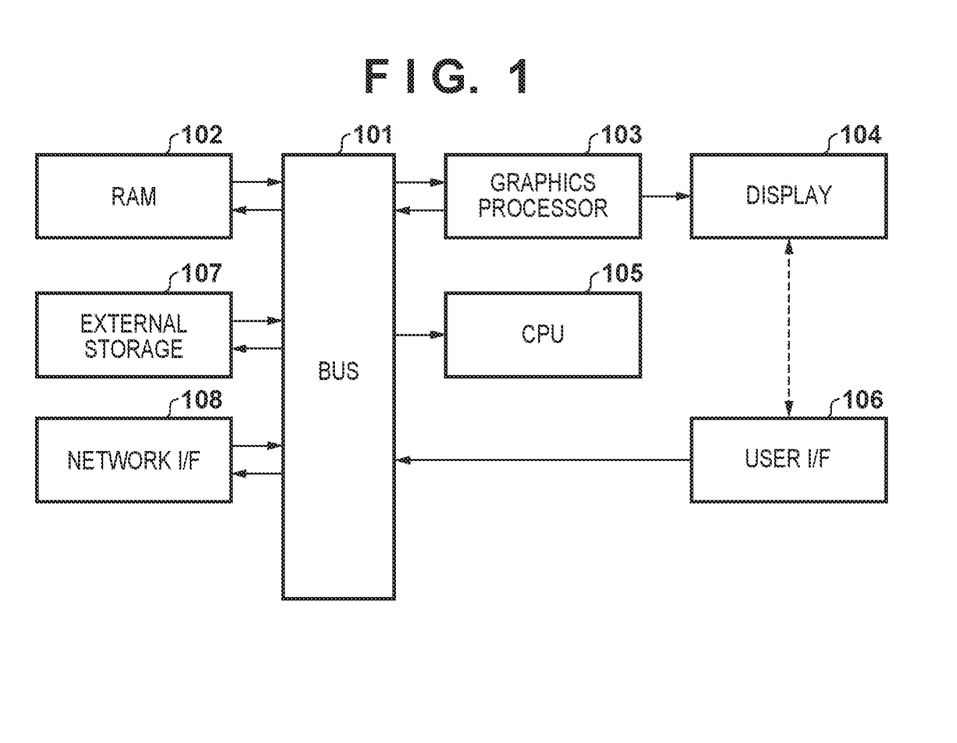
FIG. 1 is a block diagram illustrating an example of a hardware configuration of an image processing device.

First, an example of a hardware configuration of an image processing device according to the present embodiment will be described with reference to a block diagram of FIG. 1. Devices capable of presenting the above-described graph image to a user by performing the above-described processing on an acquired moving image, such as PCs (personal computers), tablet terminal devices, smartphones, digital video/still cameras, and embedded systems, can be applied to the image processing device according to the present embodiment.

A CPU 105 executes various processes using computer programs and data stored in a RAM 102. Thus, the CPU 105 controls the operation of the entire image processing device and executes or controls various processes described as being performed by the image processing device. In FIG. 1, although the number of the CPUs 105 is set to one, it may be more; in such a case, the processes described below may be processed in parallel in a multi-threaded manner.

The RAM 102 includes an area for storing computer programs and data loaded from an external storage 107 and an area for storing data received from external units through a network IF 108. The RAM 102 further includes work areas to be used by the CPU 105 and a graphics processor 103 when executing various processes. In this way, the RAM 102 can provide various areas as appropriate.

The graphics processor 103 performs image processing such as generating and modifying display information (moving images, still images, text, and the like) to be displayed on a display 104 under the control of the CPU 105 and displays, on the display 104, the display information obtained by such image processing. The graphics processor 103 also has a configuration capable of decoding an encoded stream, which is an encoded moving image, in real time.

The display 104 is a display device having a liquid crystal screen or a touch panel screen and displays the result of processing by the CPU 105 or the graphics processor 103 using image, text, and the like.

A user I/F 106 is a user interface, such as a keyboard, a mouse, and a touch panel screen, and various instructions can be inputted to the CPU 105 when the user I/F 106 is operated by the user. When the display 104 has a touch panel screen, various types of information (such as a touch position and an instruction by a tapping operation) that the user has inputted by operating the touch panel screen are also inputted to the CPU 105.

The external storage 107 is a non-volatile mass information storage device such as a hard disk drive device or an SSD (solid-state drive that uses a flash memory). The external storage 107 stores computer programs and data for causing the CPU 105 or the graphics processor 103 to execute or control the various processes described as those performed by an OS (operating system) or the image processing device. The computer programs and data stored in the external storage 107 are loaded into the RAM 102 as appropriate in accordance with the control of the CPU 105 to be processed by the CPU 105 or the graphics processor 103.

The network I/F 108 is a network interface for connecting an image processing device or to a wired and/or wireless network, such as a LAN or the Internet. The image processing device can perform data communication with devices on the network through the network I/F 108.

The RAM 102, the external storage 107, the network I/F 108, the graphics processor 103, the CPU 105, and the user I/F 106 are all connected to a common bus 101.

Figure 2:
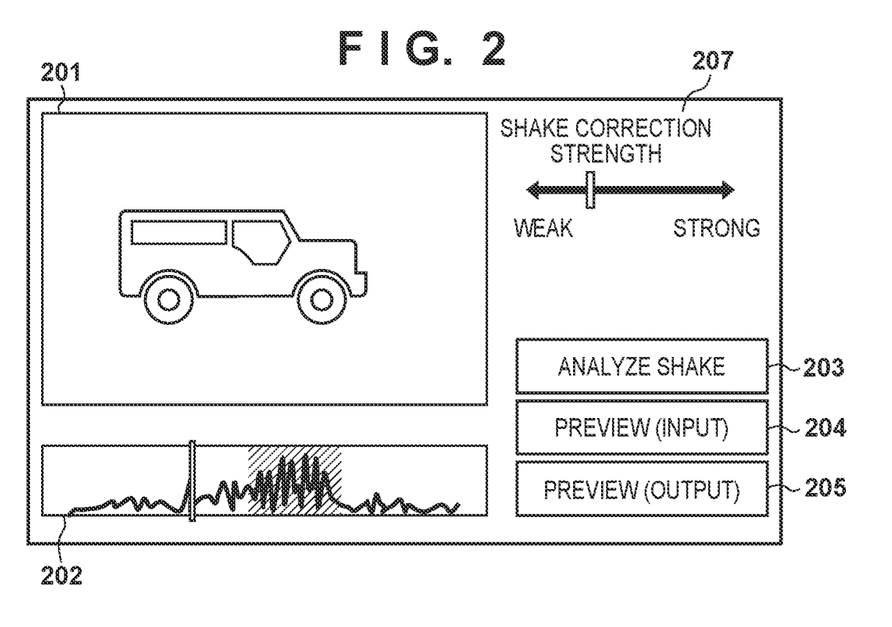
FIG. 2 a diagram illustrating an example of a display of a GUI.

The image processing device according to the present embodiment generates a GUI (graphical user interface) including the graph image generated as described above from a moving image and outputs the GUI to the display 104 to be displayed. This GUI will be described with reference to FIG. 2. The configuration of the GUI illustrated in FIG. 2 is only an example, and any configuration may be employed so long as the configuration can realize the functions of the GUI described below. Further, in the following, unless otherwise stated, it is assumed that the display control of the GUI and the processing performed in response to user operations on the GUI is performed by the CPU 105 or the graphics processor 103 under the control of the CPU 105. As illustrated in FIG. 2, the GUI includes a display region 201, a graph image 202, buttons 203 to 205, and a slider 207. Since the slider 207 and the buttons 204 to 205 are not used in the present embodiment and are used in the second embodiment or later, these will be described in the second embodiment or later.

A display region 201 is a display region for displaying a moving image. The graphics processor 103 displays, in the display region 201, a moving image loaded into the RAM 102 from the external storage 107 or a moving image received from an external unit via the network I/F 108. The method of acquiring a moving image to be displayed in the display region 201 is not limited to a specific acquisition method.

The button 203 is a button for instructing analysis of the shake amount. When the user operates the user I/F 106 to designate the button 203, the graphics processor 103, under the control of the CPU 105, analyzes the amount of shake for each frame in the moving image displayed in the display region 201, generates the graph image 202, which is the result of the analysis, and displays it on the GUI.

Figure 3:
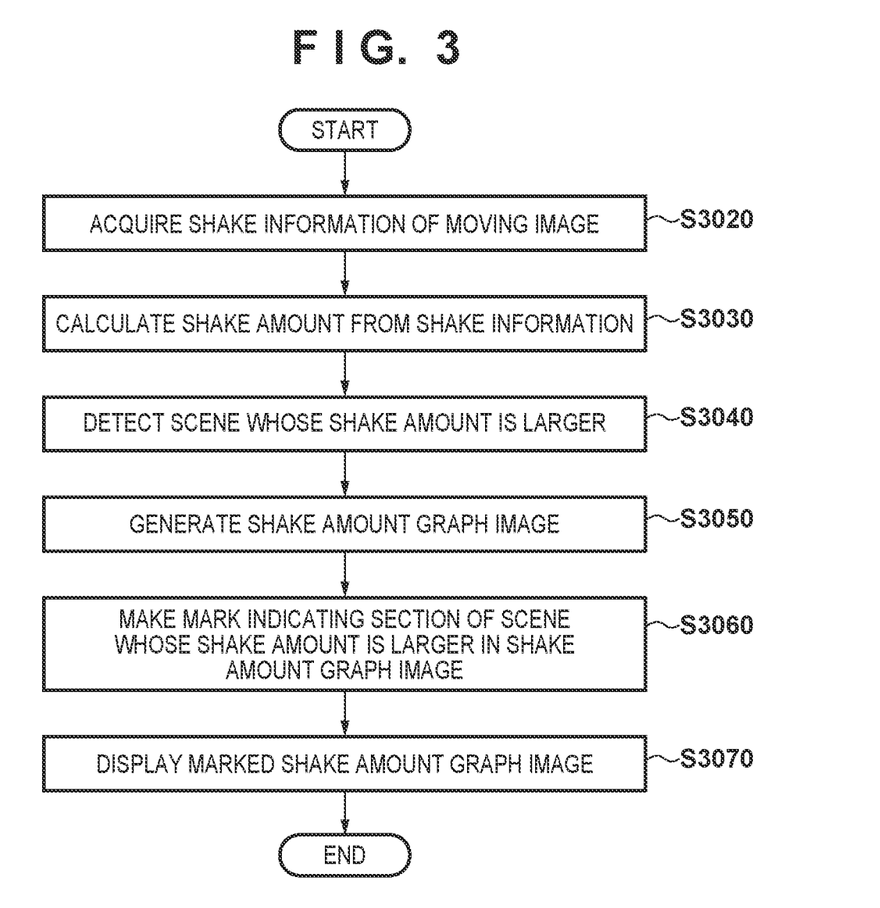
FIG. 3 is a flowchart of processing that the image processing device performs.

The process performed by the image processing device in response to the user designating the button 203 by operating the user I/F 106 will be described in accordance with a flowchart of FIG. 3. In step S3020, the graphics processor 103 obtains shake information for each frame of the moving image being played in the display region 201. For example, when obtaining the shake information of a frame of interest, the graphics processor 103 obtains a plurality of motion vectors in the frame of interest using the frame of interest and a frame adjacent to the frame of interest. When a component value in a horizontal direction and a component value in a vertical direction of each of the plurality of motion vectors that have been obtained are converted to integers, the graphics processor 103 identifies a mode value X of the component values in the horizontal direction and a mode value Y of the component values in the vertical direction. Then, the graphics processor 103 obtains, as "shake information of the frame of interest", a vector (a two-dimensional motion vector (global motion vector) representing the movement of the entire frame of interest) having X as the component value in the horizontal direction and Y as the component value in the vertical direction.

Each frame in the moving image may be an image of any color space such as an RGB image, a YUV image, or a monochrome brightness image; however, shake information is obtained using a brightness image. Therefore, when there is no brightness image of each frame in the moving image, the brightness image of each frame in the moving image is generated, and the shake information of each frame is obtained using the brightness image of each generated frame.

The shake information of each frame in the moving image may be any information so long as the information representing the movement of the entire frame; also, the method of obtaining that information is not limited to a specific method. For example, it is not necessary to obtain the shake information for all the frames; it may be obtained only for frames having a shake satisfying a predetermined condition.

In step S3030, the graphics processor 103 obtains, for each frame in the moving image, the amount of shake in the frame using the shake information of each frame included in the frame section that includes the frame. An example of a method for obtaining the amount of shake in the first i (i is an integer greater than or equal to 1)-th frame fi (a frame whose frame number is i) in the moving image will be described below. The graphics processor 103 obtains the shake amount si in the frame fi by performing an operation according to Equations 1, 2, and 3 below.

$$\bar{\mu}_i = \frac{1}{2N+1} = \sum_{j=i-N}^{i+N} \mu_j \quad \text{(Equation 1)}$$

$$\bar{v}_i = \frac{1}{2N+1} \sum_{j=i-N}^{i+N} v_j \quad \text{(Equation 2)}$$

$$s_i = \sqrt{\frac{1}{2N+1} \sum_{j=i-N}^{i+N} (\mu_i - \bar{\mu}_i)^2 + (v_i - \bar{v}_i)^2} \quad \text{(Equation 3)}$$

Here, $\mu j$ indicates the component value in the horizontal direction in the shake information of the frame fj, vj indicates the component value in the vertical direction in the shake information of the frame fj, and N indicates the reference range of the frame. In the present embodiment, the reference range of the frame is the number of frames proportional to 3 seconds. For example, when the moving image is 60 fps, N=3×60=180.

In step S3040, the graphics processor 103 identifies the frame section of the scene whose shake amount is larger in the moving image based on the amount of shake of each frame in the moving image.

First, the graphics processor 103 identifies the maximum amount of shake among the amount of shake of each frame in the moving image based on Equation 4 below.

$$i_{max} = \underset{i}{\mathrm{argmax}} |s_i| \quad \text{(Equation 4)}$$

Here, imax is the frame number of the frame having the largest amount of shake among the frames in the moving image. The graphics processor 103 then sets the frame whose frame number is imax as the reference frame. The graphics processor 103 refers to the amount of shake of each frame from the reference frame toward the first frame of the moving image and specifies, as the "start frame fs", a frame whose amount of shake is half the "amount of shake of the reference frame" for the first time. Similarly, the graphics processor 103 refers to the amount of shake of each frame from the reference frame toward the last frame of the moving image and specifies, as the "end frame fe", a frame whose amount of shake has half the "amount of shake of the reference frame" for the first time. The graphics processor 103 specifies the frame section from the start frame fs to the end frame fe as the "frame section of the scene whose shake amount is larger in the moving image".

In step S3050, the graphics processor 103 generates an image of a graph (shake amount graph) representing the amount of shake of each frame in the moving image as a shake amount graph image. The horizontal axis and the vertical axis of the shake amount graph are the frame number and the shake amount, respectively; the graphics processor 103 generates a shake amount graph by plotting points on the coordinates (i, the shake amount of the frame whose frame number is i) for i=1, 2, 3, . . . , (the frame number of the end frame in the moving image) and connecting the points with a line segment or a curved line. The resolutions for the horizontal and vertical axes are not limited to specific resolutions. The vertical axis may be within the range of 0 to (the maximum amount of shake among the amounts of shake of the respective frames in a moving image). Then, the graphics processor 103 generates an image of a shake amount graph generated in this manner as a shake amount graph image.

In step S3060, the graphics processor 103 superimposes, on the shake amount graph image, information representing the "frame section of the scene whose shake amount is larger in the moving image" specified in step S3040. In the present embodiment, the graphics processor 103 generates a shake amount graph image in which a section is marked by superimposing a semi-transparent colored rectangle on a section corresponding to the "frame section of the scene whose shake amount is larger in the moving image" in the shake amount graph image (shake amount graph). The graph image 202 of FIG. 2 is an example of a marked shake amount graph image that has been generated in this way; in the graph image 202, a shaded rectangle has been superimposed on a section corresponding to the "frame section of the scene whose shake amount is larger in the moving image".

In step S3070, the graphics processor 103 displays the marked shake amount graph image generated in step S3060 on the GUI being displayed on the display 104.

The marked shake amount graph image is appropriately scaled so as to fit in the display region for the "marked shake amount graph image" of a prescribed size in the GUI and is displayed in the display region. For example, when the horizontal size of the display region is 1000 pixels and the vertical size is 100 pixels and the number of frames of the moving image is 10000 frames, the horizontal size of the shake amount graph image becomes relatively large. In this case, however, the shake amount graph image is reduced horizontally before being displayed in the display region. Usually, when performing such a reduction, if high-frequency components are not suppressed in advance, aliasing distortion will occur. However, the processing of step S3030 has an effect similar to applying a low-pass filter to the shake amount in time series; therefore, even if the high-frequency components of the graph image, which has been converted into an image, are suppressed and then the graph image is reduced and displayed, there is no significant visual difference.

As described above, in the present embodiment, the frame section of the scene whose shake amount is larger in the moving image is explicitly displayed; therefore, the user can ascertain the position of the frame section of the scene whose shake amount is larger in the moving image without visually confirming all the frames in the moving image.

There is also a method of presenting the shake in a graph as an amplitude to a user; however, in the present embodiment, the shake amount is displayed in a graph as an intensity having only positive components; therefore, the intensity of the shake can be conveyed to the user in a manner that is easier to understand.

The above method for obtaining the amount of shake of each frame in the moving image is only an example; the amount of shake of each frame in the moving image may be obtained by another method. For example, the graphics processor 103 may obtain, as the amount of shake, the accumulation of L1 norms or the accumulation of L2 norms using the following Equation 5 or Equation 6 instead of Equation 1, Equation 2, and Equation 3 described above.

$$s_i = \sum_{j=i-N}^{i+N} |\mu_j| + |v_j| \qquad \text{(Equation 5)}$$

$$s_i = \sqrt{\frac{1}{2N+1} \sum_{j=i-N}^{i+N} \mu_j^2 + v_j^2} \qquad \text{(Equation 6)}$$

Equation 5 and Equation 6 are equations for obtaining the amount of shake si in the frame fi; in Equation 6, the square root is obtained in order normalize the sum of L2 norms and align the units.

Further, in the present embodiment, the global motion vector in the frame is obtained based on the component value in the horizontal direction and the component value in the vertical direction of the plurality of motion vectors obtained from the frame. However, this method for obtaining a global motion vector in a frame is only an example, and a global motion vector in a frame may be obtained by other methods. For example, taking a plurality of motion vectors in a frame as input, a motion vector representing a plurality of motion vectors may be obtained as a global motion vector using robust estimation algorithms such as RANSAC and M-estimator.

Further, if information indicating an orientation at which the moving image has been captured (e.g., information indicating the orientation at which image capturing has been performed measured by the gyro sensor provided in a device for capturing a moving image) is added to the moving image, a vector representing the orientations indicated by the information may be set as a global motion vector.

Further, in the present embodiment, the shake amount is obtained based on the global motion vector; however, the above-described method for obtaining the amount of shake is only an example and is not limited to a specific method. For example, the amount of shake may be obtained based on not only the vector representing the translation but also a shift in angles in the horizontal and the vertical directions.

Second Embodiment

In each of the following embodiments including the present embodiment, description will be given regard to differences from the first embodiment; unless specifically mentioned below, it is assumed that the following embodiments are the same as the first embodiment. The button 204 in FIG. 2 is a button for instructing the playback of the scene whose shake amount is larger in the moving image. When the user operates the user I/F 106 to designate the button 204, the graphics processor 103, under the control of the CPU 105, analyzes the amount of shake for each frame in the moving image displayed in the display region 201 and plays back (preview), in the display region 201, a moving image of the scene whose shake amount is larger in the moving image.

Figure 4:
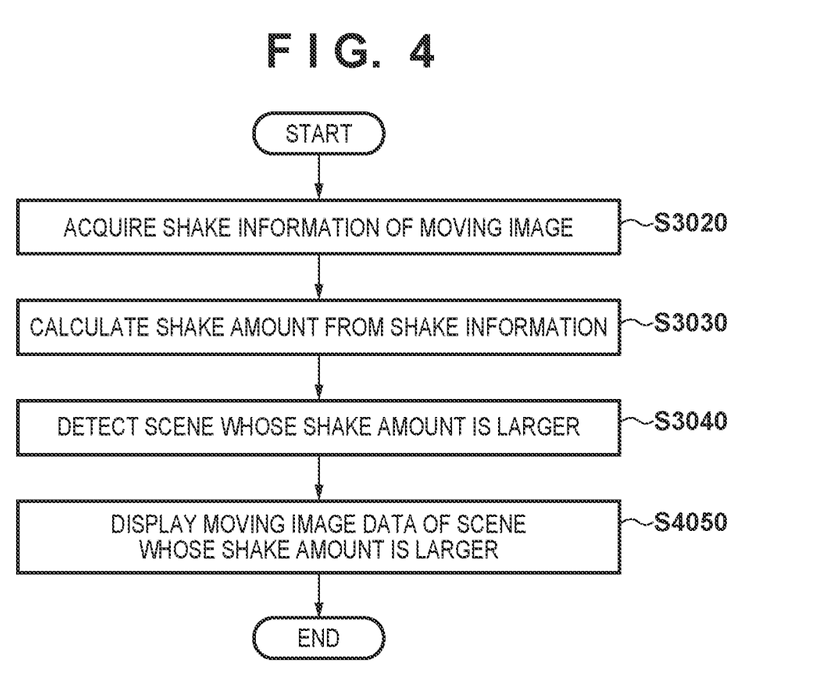
FIG. 4 is a flowchart of processing that the image processing device performs.

The process performed by the image processing device in response to the user designating the button 204 by operating the user I/F 106 will be described in accordance with a flowchart of FIG. 4. In the flowchart of FIG. 4, the processing steps that are the same as the processing steps illustrated in FIG. 3 are assigned the same step number, and description pertaining to the processing step is omitted.

In step S4050, the graphics processor 103 causes the moving image in the frame section identified in step S3040 to be played back in the display region 201. The region for playing back the moving image in the frame section specified in step S3040 is not limited to the display region 201; for example, it may be another region in the GUI or a separate window from the GUI. Further, the graphics processor 103 may play back the moving image in the frame section specified in step S3040 only once or repeatedly play back the moving image unless an instruction is performed by the user.

As described above, in the present embodiment, the frame section of the scene whose shake amount is larger in the moving image is played back; therefore, the user can confirm, as a moving image, the amount of shake and the like in the scene whose shake amount is larger in the moving image without visually confirming all the frames in the moving image.

A configuration may be taken such that when a frame section of the scene whose shake amount is larger in the moving image has been specified, frame section information defining the frame section (e.g., information indicating the start frame and end frame of the frame section) is be stored in the external storage 107 or the like. In such a case, for that moving image, from the next time, it is possible to read the frame section information stored for the moving image and play back the moving image of the frame section that the read frame section information indicates without performing the processing of the above steps S3020 to S3040. This is the same even if the frame section is detected in advance by another method.

Third Embodiment

The slider 207 in FIG. 2 is for specifying the strength for correcting the shake (a shake correction strength). When the user operates the user I/F 106 and moves the slider 207 to the left, a weaker shake correction strength is set, and when the user operates the user I/F 106 and moves the slider 207 to the right, a stronger shake correction strength is set.

Figure 5:
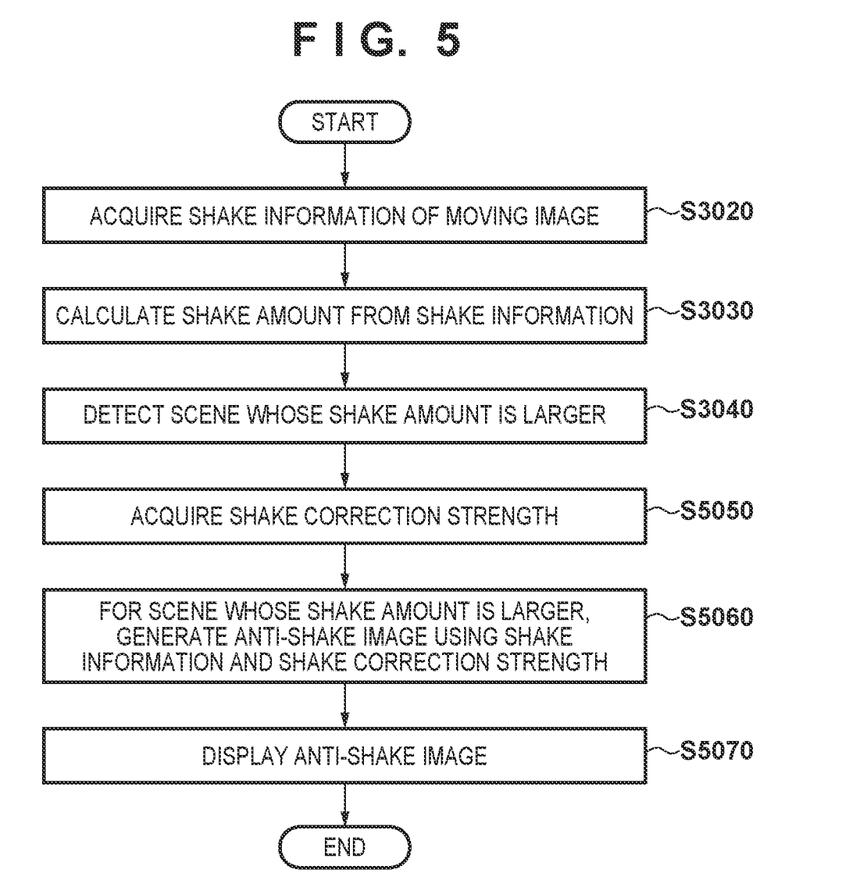
FIG. 5 is a flowchart of processing that the image processing device performs.

The button 205 of FIG. 2 is a button for inputting an instruction for generating and displaying an anti-shake image in which the shake has been corrected in the frame for each frame in the frame section of the scene whose shake amount is larger in the moving image. When the user operates the user I/F 106 to designate the button 205, the graphics processor 103, under the control of the CPU 105, performs processing in accordance with a flowchart of FIG. 5. The process performed by the image processing device in response to the user designating the button 205 by operating the user I/F 106 will be described in accordance with the flowchart of FIG. 5. In the flowchart of FIG. 5, the processing steps that are the same as the processing steps illustrated in FIG. 3 are assigned the same step number, and description pertaining to the processing step is omitted.

In step S5050, the graphics processor 103 acquires the shake correction strength that has been set in accordance with the position of the slider 207, which is moved by the user operating the user I/F 106. In the present embodiment, it is assumed that shake correction strengths of five levels (shake correction strengths 1 (weak) to 5 (strong)) are set in accordance with the position of the slider 207. Here, in step S5050, the graphics processor 103 acquires the shake correction strength (any of shake correction strengths 1 (weak) to 5 (strong)) that has been set in accordance with the position of the slider 207, which is moved by the user operating the user I/F 106.

In step S5060, for each frame in the frame section specified in step S3040, the graphics processor 103 generates an anti-shake image in which the shake in the frame has been corrected (in which anti-shake processing has been performed on the frame) using the shake information of the frame and the shake correction strength.

A process for generating an anti-shake image of the frame fi will be described below. First, the graphics processor 103 obtains a maximum correction amount m from a shake correction strength $s_s$ in accordance with the following Equation 7.

$$m = 0.02 s_s \qquad \text{(Equation 7)}$$

In Equation 7, when the correction strength is 5, for example, the maximum correction amount is 0.1; that is, cropping is performed such that respectively at the top and bottom, 0.1 times the height of the image is excluded, and on the left and right, 0.1 times the width of the image is excluded, and the image size is multiplied by $1/(1−0.1×2)$ for adjustment.

Here, when the pixel position in the frame fi is (x, y) and the pixel position in the anti-shake image of the frame fi is (x', y'), the projection (projection with the center position of the image as the origin) from the pixel position (x, y) to the pixel position (x', y') accords with the following Equation 8.

$$\begin{pmatrix} x' \\ y' \end{pmatrix} = \frac{1}{1-2m} \begin{pmatrix} x - \min(w*m, \bar{\mu}_i) \\ y - \min(h*m, \bar{v}_i) \end{pmatrix} \qquad \text{(Equation 8)}$$

Here, w and h are preset parameters. Therefore, for each pixel position (x, y) in the frame fi, the graphics processor 103 sets the pixel value of the pixel position (x, y) at the pixel value of the pixel position (x', y') on the anti-shake image obtained by converting the pixel position (x, y) using Equation 8. Here, $\bar{\mu}_i$ and $\bar{v}_i$ and each is obtained from Equations 1 and 2 above. In such a case, N is the number of frames proportional to a second. This relates to the period of shake that is desired to be corrected; the larger N is, the more the shake of a low frequency can be suppressed. The pixel value of the pixel for which the pixel value has not been set in the anti-shake image is obtained by an interpolation process and the like using the pixel value of the pixels surrounding the pixel.

The graphics processor 103 encodes the anti-shake image generated for each frame in the frame section specified in step S3040 and stores it in a memory such as the external storage 107 or the RAM 102.

In step S5070, the graphics processor 103 reads and decodes in real time the anti-shake image of each frame stored in a memory, such as the external storage 107 or the RAM 102, in step S5060 and displays the anti-shake image of each decoded frame in the display region 201 in the GUI being displayed on the display 104. The anti-shake image may be displayed in another area of the GUI or in a separate window from the GUI.

As described above, in the present embodiment, the anti-shake image of each frame in the frame section of the scene whose shake amount is larger in the moving image is generated and played back. By this, the user can confirm the quality of anti-shake and the like for each frame in the frame section of the scene with a large amount of shake in the moving image without visually confirming all the frames in the moving image.

In the present embodiment, after the anti-shake images of all the frames in the frame section of the scene whose shake amount is larger in the moving image are generated, the anti-shake images of the respective frames in the frame section are sequentially displayed. However, when an anti-shake image of a frame is generated, that anti-shake image may be displayed without waiting for generation of an anti-shake image of a subsequent frame following that frame.

It has been described that, in the present embodiment, the anti-shake is performed based on a two-dimensional vector, but the present invention is not limited thereto, and for example, the anti-shake image may be generated by expressing the shake in a higher-order matrix such as a homography matrix or affine transformation and applying the inverse correction thereof.

Further, in the present embodiment, the maximum correction amount is calculated from the shake correction strength, and the maximum correction amount is used as a parameter of the anti-shake process, however, in addition, a configuration may be taken so as to prompt the user to set the maximum period of the correction, for example.

Fourth Embodiment

Figure 6:
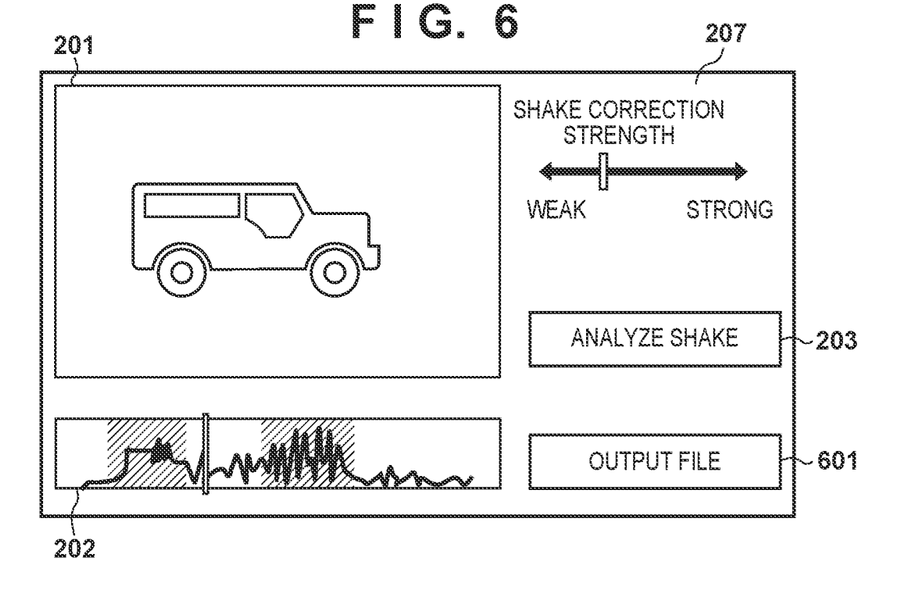
FIG. 6 a diagram illustrating an example of a display of a GUI.

In the present embodiment, the graphics processor 103 displays the GUI illustrated in FIG. 6 on the display 104. The GUI illustrated in FIG. 6 has a configuration in which the buttons 204 and 205 have been omitted from and a button 601 has been added to the GUI illustrated in FIG. 2. The processing performed by the image processing device to generate the shake amount graph image in the display region 201 in such a GUI will be described in accordance with a flowchart of FIG. 7. In the processing steps illustrated FIG. 7, the processing steps that are the same as the processing steps in FIG. 3 are assigned the same step number, and description pertaining to the processing step is omitted.

Figure 7:
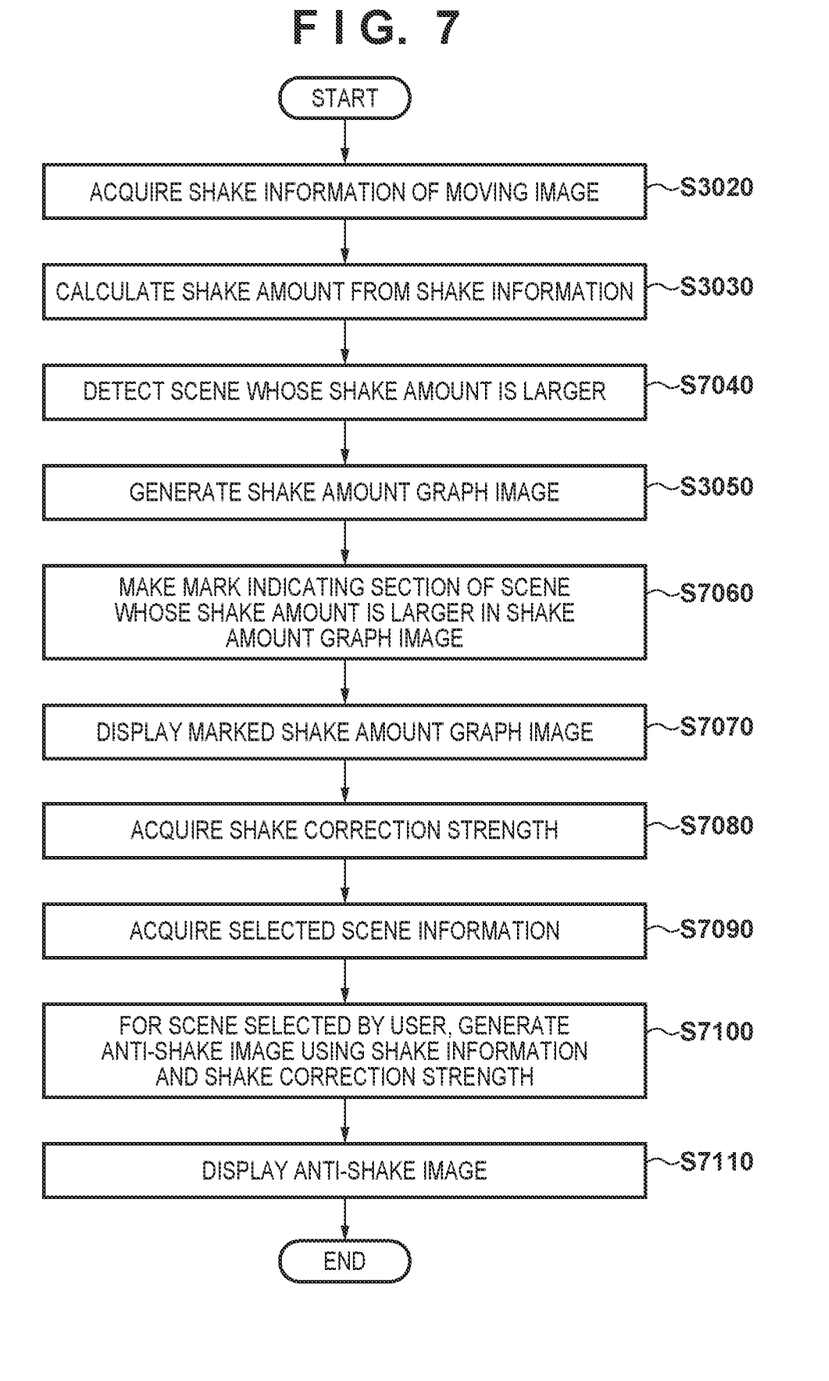
FIG. 7 is a flowchart of processing that the image processing device performs.

In step S7040, the graphics processor 103 identifies a frame section of a scene whose shake amount is larger in the moving image based on the amount of shake of each frame in the moving image. In the present embodiment, the graphics processor 103 uses, as a reference frame, a frame in which the amount of shake in the moving image is equal to or larger than a threshold. Therefore, in the present embodiment, there may be a plurality of reference frames. The graphics processor 103 performs the same processing as the above-described step S3040 for each reference frame and specifies the "frame section of the scene whose shake amount is larger in the moving image" for each reference frame.

Here, when a plurality of "frame sections of scenes whose shake amounts are larger in the moving image" are set, there may be overlapping portions between one "frame section of a scene whose shake amount is larger in the moving image" and another "frame section of a scene whose shake amount is larger in the moving image". In such a case, the graphics processor 103 merges one frame section with another frame section to form one frame section. For example, it is assumed that the start frame position and the end frame position of one frame section are fs1 and fe1, respectively, and the start frame position and the end frame position of another frame section are fs2 and fe2, respectively. Here, it is assumed that fe1>fs2. In this instance, these frame sections are merged to form a frame section whose start frame position is fs1 and end frame position is fe2.

This also applies to the case where three or more adjacent frame sections have overlapping portions: the three or more frame sections are merged into a frame section from the smallest frame start position to the largest frame end position in the three or more frame sections.

In step S7060, for each of the "frame sections of scenes whose shake amounts are larger in the moving image", the graphics processor 103 superimposes, on the shake amount graph image, information representing the frame section specified in step S7040. In the present embodiment, for each of the "frame sections of scenes whose shake amounts are larger in the moving image", the graphics processor 103 generates a shake amount graph image in which a section is marked by superimposing a semi-transparent colored rectangle on a section corresponding to the frame section in the shake amount graph image (shake amount graph).

In step S7070, the graphics processor 103 displays the marked shake amount graph image generated in step S7060 on the GUI being displayed on the display 104.

In step S7080, the graphics processor 103 acquires the shake correction strength in the same manner as in step S5050 described above.

In step S7090, among the frame sections marked in the shake amount graph image, the graphics processor 103 acquires selected scene information indicating the selected frame section (selected section, selection scene) which has been selected by the user operating the user I/F 106. It is assumed that the selected scene information indicates the start and end frame positions of the selected frame section.

In step S7100, for each frame in the frame section indicated by the selected scene information (selected frame section), the graphics processor 103 generates an anti-shake image in which the shake in the frame has been corrected (in which the frames have been subjected to anti-shake processing) using the shake correction strength acquired in step S7080 in the same manner as in the above-described step S5060. The graphics processor 103 encodes the anti-shake image generated for each frame in the selected frame section and stores it in a memory such as the external storage 107 or the RAM 102.

In step S7110, the graphics processor 103 reads and decodes in real time the anti-shake image of each frame stored in a memory, such as the external storage 107 or the RAM 102, in step S7100 and displays the anti-shake image of each decoded frame in the display region 201 in the GUI being displayed on the display 104.

As described above, in the present embodiment, the user can confirm a plurality of frame sections as frame sections of scenes whose shake amounts are larger in the moving image. By this, the user can confirm the quality of anti-shake and the like for each frame in the frame section that the user has selected without visually confirming all the frames in the moving image.

In each of the above embodiments, a method of superimposing a semi-transparent colored rectangle on the frame section has been adopted as a method for notifying the user of a frame section of a scene whose shake amount is larger in the moving image; however, the user may be notified of the frame section by another method. For example, a marker may be displayed at position on the shake amount graph image corresponding to the start frame position and at a position on the shake amount graph image corresponding to the end frame position of the scene whose shake amount is larger in the moving image. Further, for example, the start frame position and the end frame position may be displayed in a different display region from the display region of the shake amount graph image. As described above, if a graph representing the shake amount for each frame in the moving image and information representing the frame section of a scene whose shake amount is larger in the moving image are to be displayed, the display method thereof is not limited to a specific display method.

In addition, in each of the above-described embodiments, a configuration has been taken such that some data is not encoded and some data is encoded; however, which data is encoded and which data is not encoded are not limited to a specific form.

Further, in each of the above-described embodiments, the shake amount graph is displayed as an example of information representing the shake amount for each frame in the moving image. However, the information representing the shake amount for each frame in the moving image is not limited to such a graph. For example, the shake amount for each frame in the moving image may be displayed as a numerical value (text) or an icon (image), or a bar graph.

The numerical values; the process timings; the processing order; the process performer; the configuration, transmission destination, transmission source, and storage location of data (information); the configuration and operation method of GUIs; and the like used in each of the above embodiments have been given as examples to provide a detailed description, and the present invention is not intended to be limited to such examples.

Further, some or all of the embodiments described above may be combined as appropriate and used. Further, some or all of the embodiments described above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-071332, filed Apr. 20, 2021, which is hereby incorporated by reference herein in its entirety.

What is claimed is:

1. An image processing device comprising:
   one or more circuits; or
   one or more processors and at least one memory, the at least one memory being coupled to the one or more processors and having stored thereon instructions executable by the one or more processors, wherein at least one of the one or more circuits or the execution of the instructions cause the image processing device to function as:
   a specification unit configured to specify, among a plurality of frames constituting a moving image, a section in the moving image of frames corresponding to a scene whose shake amount is larger, based on the plurality of frames,
   wherein the specification unit sets, as a reference frame, a frame whose shake amount is the largest among frames in the moving image; sets, as a start frame, a frame whose shake amount is half the largest shake amount in frames preceding the reference frame; sets, as an end frame, a frame whose shake amount is half the largest shake amount in frames succeeding the reference frame; and specifies, as a section in the moving image of frames corresponding to a scene whose shake amount is larger, a section from the start frame to the end frame; and
   an output unit configured to output information representing the section,
   wherein the output unit, in accordance with an instruction from a user, generates and causes to display an anti-shake image in which a shake in each frame in the section has been corrected, and
   wherein the output unit, in accordance with an instruction from a user, sets a correction parameter related to period of the correction.

2. The image processing device according to claim 1 further comprising:
   an acquisition unit configured to acquire a shake amount for each frame in a moving image, wherein
   the acquisition unit obtains a global motion vector for each frame in the moving image and, for each frame in the moving image, acquires a shake amount of that frame based on global motion vectors of respective frames included in a section that includes that frame.

3. The image processing device according to claim 1, wherein the output unit, in accordance with an instruction from a user, causes to display a moving image in the section.

4. The image processing device according to claim 1, wherein the specification unit sets, as reference frames, a frame whose shake amount is a threshold or more in frames in the moving image; and for each reference frame, sets, as a start frame, a frame whose shake amount is half a shake amount of the reference frame in frames preceding the reference frame and sets, as an end frame, a frame whose shake amount is half shake amount of the reference frame in frames succeeding the reference frame; and specifies, as a section in the moving image of frames corresponding to a scene whose shake amount is larger, a section from the start frame to the end frame.

5. The image processing device according to claim 4, wherein the output unit, among sections specified by the specification unit, sets, as a selected section, a section that has been selected in accordance with an instruction from a user and, in accordance with an instruction from a user, generates and causes to display an anti-shake image in which a shake in each frame in the selected section has been corrected.

6. The image processing device according to claim 1, wherein the output unit generates a graph representing a shake amount of each frame in the moving image and causes to display the graph and information representing the section.

7. The image processing device according to claim 6, wherein the output unit marks and causes to display the section in the graph.

8. An image processing method comprising:
   providing one or more circuits; or one or more processors and at least one memory, the at least one memory being coupled to the one or more processors and having stored thereon instructions executable by the one or more processors, wherein at least one of the one or more circuits or the execution of the instructions cause the image processing device to execute the steps including:
   specifying, among a plurality of frames constituting a moving image, a section in the moving image of frames corresponding to a scene whose shake amount is larger, based on the plurality of frames;
   setting, as a reference frame, a frame whose shake amount is the largest among frames in the moving image;
   setting, as a start frame, a frame whose shake amount is half the largest shake amount in frames preceding the reference frame;
   setting, as an end frame, a frame whose shake amount is half the largest shake amount in frames succeeding the reference frame;
   specifying, as a section in the moving image of frames corresponding to a scene whose shake amount is larger, a section from the start frame to the end frame; and
   outputting information representing the section,
   wherein the outputting step, in accordance with an instruction from a user, generates and causes to display an anti-shake image in which a shake in each frame in the section has been corrected, and
   wherein the outputting step, in accordance with an instruction from a user, sets a correction parameter related to period of the correction.

9. A non-transitory computer-readable storage medium that stores a computer program for causing a computer including one or more circuits; or one or more processors and at least one memory, the at least one memory being coupled to the one or more processors and having stored thereon instructions executable by the one or more processors, wherein at least one of the one or more circuits or the execution of the instructions cause the image processing device to function as:
   a specification unit configured to specify, among a plurality of frames constituting a moving image, a section in the moving image of frames corresponding to a scene whose shake amount is larger, based on the plurality of frames,
   wherein the specification unit sets, as a reference frame, a frame whose shake amount is the largest among frames in the moving image; sets, as a start frame, a frame whose shake amount is half the largest shake amount in frames preceding the reference frame; sets, as an end frame, a frame whose shake amount is half the largest shake amount in frames succeeding the reference frame; and specifies, as a section in the moving image of frames corresponding to a scene whose shake amount is larger, a section from the start frame to the end frame; and an output unit configured to output information representing the section, wherein the output unit, in accordance with an instruction from a user, generates and causes to display an anti-shake image in which a shake in each frame in the section has been corrected, and wherein the output unit, in accordance with an instruction from a user, sets a correction parameter related to period of the correction.

\* \* \* \* \*